US010251111B2

(12) United States Patent
Wang

(10) Patent No.: US 10,251,111 B2
(45) Date of Patent: Apr. 2, 2019

(54) BASE STATION HANDOVER METHOD IN HETEROGENEOUS NETWORK, AND BASE STATION

(71) Applicant: ZTE CORPORATION, Shenzhen, Guangdong Province (CN)

(72) Inventor: Xin Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/549,172

(22) PCT Filed: Sep. 21, 2015

(86) PCT No.: PCT/CN2015/090169
§ 371 (c)(1),
(2) Date: Aug. 7, 2017

(87) PCT Pub. No.: WO2016/127646
PCT Pub. Date: Aug. 18, 2016

(65) Prior Publication Data
US 2018/0035344 A1 Feb. 1, 2018

(30) Foreign Application Priority Data
Feb. 13, 2015 (CN) .......................... 2015 1 0080997

(51) Int. Cl.
*H04W 36/30* (2009.01)
*H04W 36/08* (2009.01)
(Continued)

(52) U.S. Cl.
CPC ....... *H04W 36/30* (2013.01); *H04W 36/0016* (2013.01); *H04W 36/0069* (2018.08);
(Continued)

(58) Field of Classification Search
CPC ............ H04W 36/08; H04W 36/0016; H04W 36/0083; H04W 36/30; H04W 92/20; H04W 88/02; H04W 88/08
(Continued)

(56) References Cited

U.S. PATENT DOCUMENTS

2014/0087731 A1* 3/2014 Zhang ............... H04W 36/0055
455/436
2017/0181044 A1* 6/2017 Wen .................. H04W 36/0027
2017/0195935 A1* 7/2017 Xu ......................... H04W 36/30

FOREIGN PATENT DOCUMENTS

CN 104301955 A 1/2015
CN 104349374 A 2/2015
(Continued)

OTHER PUBLICATIONS

3GPP TSG-RAN WG3 Meeting #87 R3-150398, Athens, Greece, Feb. 9-13, 2015.*
(Continued)

*Primary Examiner* — Timothy Pham
(74) *Attorney, Agent, or Firm* — Ling Wu; Stephen Yang; Ling and Yang Intellectual Property

(57) ABSTRACT

Embodiments of the present disclosure disclose a base station handover method in a heterogeneous network, and a base station. The method includes: after receiving a handover request message of a first base station, a target base station executes an admission control, and judges whether a connection of UE at a second base station is reserved for the UE after an access of the UE; if the connection is reserved, the target base station sends an assistance request message to the second base station to request the second base station to assist the target base station to provide a dual connectivity service for the UE, and replies a handover request acknowl-
(Continued)

edgment message to the first base station after a reply message of the second base station is obtained.

12 Claims, 6 Drawing Sheets

(51) Int. Cl.
*H04W 36/00* (2009.01)
*H04W 88/02* (2009.01)
*H04W 88/08* (2009.01)
*H04W 92/20* (2009.01)

(52) U.S. Cl.
CPC ....... *H04W 36/0083* (2013.01); *H04W 36/08* (2013.01); *H04W 88/02* (2013.01); *H04W 88/08* (2013.01); *H04W 92/20* (2013.01)

(58) Field of Classification Search
USPC ........................................ 455/436
See application file for complete search history.

(56) References Cited

FOREIGN PATENT DOCUMENTS

| WO | 2014026543 A1 | 2/2014 |
| WO | 2014073302 A1 | 5/2014 |
| WO | 2014109606 A1 | 7/2014 |
| WO | 2014111557 A1 | 7/2014 |
| WO | WO2015009075 A1 | 1/2015 |
| WO | 2015016654 A1 | 2/2015 |

OTHER PUBLICATIONS

3GPP TSG-RAN WG2 Meeting #85 R2-140347, Prague, Czech Republic, Feb. 10-14, 2014.*
ZTE."Consideration on the inter-MeNB handover enhancement in dual connectivity" 3GPP TSG-RAN WG3 #87 R3-150238, Jan. 30, 2015, Section 2.

* cited by examiner

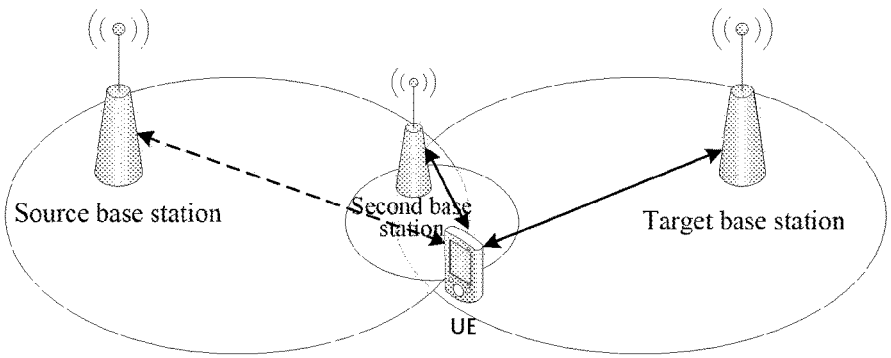

FIG. 3

| When a first base station decides to initiate a base station handover procedure, in a handover request message sent to a target base station, a result of a measurement performed by UE on a cell signal of a second base station which the UE accesses, information about a serving cell of the second base station and resource configuration information for the UE at the second base station are carried | Step 401 |

↓

| After the target base station receives the handover request message of the first base station, the target base station executes an admission control, and judges whether a connection of the UE at the second base station is reserved for the UE after an access of the UE, and if the connection is reserved, sends an assistance request message to the second base station to request the second base station to assist the target base station to provide a dual connectivity service for the UE | Step 402 |

↓

| After the second base station receives the assistance request message of the target base station which requests for assisting to provide the dual connectivity service for the UE, if the second base station agrees to establish an interface, the second base station sends an acknowledgment message to the target base station, herein the acknowledgment message includes an X2 interface identifier allocated by the second base station to the UE | Step 403 |

↓

| After the target base station obtains an agreement reply of the second base station, the target base station replies a handover request acknowledgment message to the first base station | Step 404 |

FIG. 4

BASE STATION HANDOVER METHOD IN HETEROGENEOUS NETWORK, AND BASE STATION

TECHNICAL FIELD

Embodiments of the present disclosure relates to but not limited to the field of mobile communication systems, in particular to a base station handover method in a heterogeneous network, and a base station.

BACKGROUND

Third Generation Partnership Project (3GPP) considers that the deployment of small cells (cells which are established by low-power base stations, and the small cells are distinguished from macro cells established by macro base stations) and enhancement of capabilities of the small cells are one of subjects which are most interested by people in future development of communication networks. At present, a heterogeneous network deployment scenario commonly approved by the communication industry is that low-power nodes are deployed in a coverage range of a macro base station or at a boundary of the macro base station, and the macro base station and the low-power nodes jointly form a Radio Access Network (RAN) in an Evolved Universal Terrestrial Radio Access Network (E-UTRAN) system, to provide combined data transmission services for User Equipment (UE).

For a system architecture under the typical scenario, an example illustrated in FIG. 1 may be referred. In the RAN, a base station which has an S1-MME interface with a Mobility Management Entity (MME) in a Core Network (CN) and is considered as a mobile anchor point by the CN is called a Master eNB (MeNB). A node which is connected with MeNB through an X2 interface and provides additional radio resources for UE is called a Secondary eNB (SeNB). Radio Uu interfaces are established between UE and MeNB and between UE and SeNB, and control plane signaling and user plane data may be transmitted on the interfaces, which is also called that UE is in a Dural Connectivity (DC) state. Since the system architecture allows two (even more) base stations to simultaneously provide radio resources for one UE to support communication services, data throughput of the network is greatly improved and can satisfy increasing demands of users for data rate as possible.

For a user plane transmission mode and a form of a protocol stack under the system architecture, two examples illustrated in FIG. 2a and FIG. 2b may be referred. By taking downlink data as an example, a transmission mode of an Evolved Packet System (EPS) bearer #1 is the same as a standard mode of a single connectivity system, i.e., a Serving Gateway (S-GW) sends data packets to an MeNB through an S1-U interface, and then the MeNB sends the data packets to UE through a Uu interface. In DC, a bearer having a radio protocol stack only located at MeNB and only using MeNB resources is called a Master Cell Group (MCG) bearer. As illustrated in FIG. 2a, this mode is temporarily called user plane architecture mode 1 in this document. A transmission of an EPS bearer #2 is that data packets are sent to an SeNB through an S1-U interface directly connected to SeNB, and then the SeNB sends the data packets to UE through a Uu interface; and a bearer having a radio protocol stack only located at SeNB and only using SeNB resources is called a Secondary Cell Group (SCG) bearer. As illustrated in FIG. 2b, this mode is temporarily called user plane architecture mode 2 in this document. A transmission of EPS bearer #2 is that S-GW sends data packets to the MeNB through an S1-U interface, then the MeNB only sends one part of data packets of the bearer to UE through a Uu interface, and the other part of data packets are delivered to SeNB through an X2 interface and then the SeNB sends this part of data packets to UE through a Uu interface; and a bearer having radio protocol stacks located at MeNB and SeNB and using MeNB and SeNB resources to transmit is called a split bearer. In this document, the SCG bearer and the split bearer are collectively called split bearers.

In a process that UE transmits data and/or moves, there are two scenarios. One scenario is that, for example, when a variable in a protocol entity is accumulated to a certain threshold, partial configuration parameters of the UE need to be modified. The other scenario is that, for example, when a radio signal quality decreases to a certain threshold or the load of a current serving base station is too heavy, the serving base station of the UE needs to be handed over from a current connected eNB (called source eNB) to another eNB which satisfies conditions (called a target eNB). The two scenarios need to be realized through a procedure of intra-eNB handover (UE still establishes a connection with the same eNB before and after handover and only partial parameters are reconfigured) or inter-eNB handover (UE establishes connections with different eNBs before and after handover).

Under the system architecture in this document, when MeNB of UE in a DC state needs to be handed over, according to the related art, the SeNB of UE will be released before or after a handover procedure. If there are service demands or base station nodes which have suitable conditions after the UE accesses the target eNB (for the intra-eNB handover, the target eNB is the source MeNB), the target eNB will add an SeNB for the UE again. In an exemplary embodiment, for the intra-eNB handover, if the conditions of the source SeNB always satisfy a specific threshold, the MeNB may simultaneously carry (intra-) handover information of the MeNB and release and addition information of the SeNB in one piece of control plane signaling, i.e., the UE is indicated to perform reconfiguration on resources of the two eNBs through this piece of signaling only.

Accordingly, it can be seen that, under the network design capability in the related art, a link between the UE and the SeNB will be interrupted due to MeNB handover of UE, and the protocol entity related to the split bearer also needs to be reestablished. Even though in a preferred intra-MeNB handover procedure, if time spent by UE in accessing a cell of the target eNB is relatively long, time of interruption of user plane data between the UE and the SeNB will also be lengthened accordingly. That means that radio resources which can be provided by the network for UE are non-occupied, i.e., data throughput of UE which originally can be improved is limited for this reason, and thereby the overall service performance of the network is decreased.

SUMMARY

An embodiment of the present disclosure provides a base station handover method in a heterogeneous network, and a base station, to improve the performance of a link between user equipment and a second base station.

An embodiment of the present disclosure provides a base station handover method in a heterogeneous network, including:

after receiving a handover request message of a first base station, executing, by a target base station, an admission control, and judging whether a connection of a UE at a second base station is reserved for the UE after an access of the UE; if the connection is reserved, sending an assistance request message to the second base station to request the second base station to assist the target base station to provide a dual connectivity service for the UE, and replying a handover request acknowledgment message to the first base station after obtaining a reply message of the second base station.

In an exemplary embodiment, the method further includes:

judging, by the target base station, whether a split bearer borne by the second base station and a resource corresponding to the split bearer need to be reconfigured; and if the split bearer and the resource corresponding to the split bearer need to be reconfigured, the assistance request message further including resource reconfiguration information of the split bearer.

In an exemplary embodiment, the assistance request message is an X2 interface message.

In an exemplary embodiment, the assistance request message is a secondary base station addition request message or a secondary base station modification request message.

In an exemplary embodiment, the assistance request message includes an identifier of the UE at a second base station side.

In an exemplary embodiment, the assistance request message further includes a tunnel address for data forwarding.

In an exemplary embodiment, the handover request acknowledgment message includes resource reconfiguration information allocated by the target base station for the UE and resource reconfiguration information allocated by the second base station for the UE; or the handover request acknowledgment message includes resource reconfiguration information allocated by the target base station for the UE and an indication used to indicate that the UE keeps a link between the UE and the second base station and keeps related resource configuration.

The embodiment of the present disclosure further provides a base station, including:

a first handover module configured to, after receiving a handover request message of a first base station, execute an admission control and judge whether a connection of UE at a second base station is reserved for the UE after an access of the UE; and a request module configured to, under a situation where the first handover module judges that the connection is reserved, send an assistance request message to the second base station to request the second base station to assist the target base station to provide a dual connectivity service for the UE, and reply a handover request acknowledgment message to the first base station after obtaining a reply message of the second base station, herein the assistance request message includes an identifier of the UE at a second base station side.

In an exemplary embodiment, the first handover module is further configured to judge whether a split bearer borne by the second base station and a resource corresponding to the split bearer need to be reconfigured; and the request module is further configured to, under a situation where the first handover module judges that the split bearer and the resource corresponding to the split bearer need to be reconfigured, send to the second base station the assistance request message which includes resource reconfiguration information of the split bearer.

In an exemplary embodiment, the assistance request message is any one of the following messages: a secondary base station addition request message, a secondary base station modification request message and other X2 interface message.

The handover request acknowledgment message includes: resource reconfiguration information allocated by the target base station for the UE and resource reconfiguration information allocated by the second base station for the UE.

Or, the handover request acknowledgment message includes: resource reconfiguration information allocated by the target base station for the UE and an indication used to indicate that the UE keeps a link between the UE and the second base station and keeps related resource configuration.

An embodiment of the present disclosure further provides a base station handover method in a heterogeneous network, including:

when a first base station decides to initiate a base station handover procedure, sending, by a first base station, a handover request message to a target base station, herein the handover request message at least carries a result of a measurement performed by UE in a cell signal of a second base station which the UE accesses, information about a serving cell of the second base station and resource configuration information for the UE at the second base station.

In an exemplary embodiment, the method further includes:

receiving, by the first base station, a handover request acknowledgment message of the target base station; and sending, by the first base station, to the second base station an X2 control plane message for indicating the second base station to release an interface related to the UE.

An embodiment of the present disclosure further provides a base station, including:

a second handover module configured to decide to initiate a base station handover procedure; and a first sending module configured to send a handover request message to a target base station, herein the handover request message at least carries a result of a measurement performed by UE on a cell signal of a second base station which the UE accesses, information about a serving cell of the second base station and resource configuration information for the UE at the second base station.

In an exemplary embodiment, the base station further includes:

a first receiving module configured to receive a handover request acknowledgment message of the target base station; and the first sending module is further configured to send to the second base station an X2 control plane message for indicating the second base station to release an interface related to the UE.

An embodiment of the present disclosure further provides a base station handover method in a heterogeneous network, including:

after a second base station receives an assistance request message of a target base station which requests for assisting to provide a dual connectivity service for UE, if the second base station agrees to establish an interface, sending an acknowledgment message to the target base station, herein the acknowledgment message includes an X2 interface identifier allocated by the second base station for the UE.

In an exemplary embodiment, the acknowledgment message further includes a new resource configuration allocated by the second base station for the UE and/or an allocated tunnel address for data forwarding according to a demand of the target base station.

The embodiment of the present disclosure further provides a base station, including:

a second receiving module configured to receive an assistance request message of a target base station which requests for assisting to provide a dual connectivity service for UE; and a second sending module configured to, under a situation where an interface is agreed to be established, send an acknowledgment message to the target base station, herein the acknowledgment message includes an X2 interface identifier allocated by the second base station for the UE.

An embodiment of the present disclosure further provides a base station handover method in a heterogeneous network, including:

when a first base station decides to initiate an intra-base station handover procedure, judging, by the first base station, whether a connection of UE at a second base station is reserved; if the connection is reserved, sending an indication message to the UE, herein the indication message indicates the UE to leave a source cell, access a target cell and at the same time keep the connection with the second base station.

In an exemplary embodiment, the method further includes: sending, by the first base station, a handover indication message to the second base station, herein the handover indication message is used for informing that a resource of a master serving base station is reconfigured.

An embodiment of the present disclosure further provides a base station, including:

a third handover module configured to, when deciding to initiate an intra-base station handover procedure, judge whether a connection of UE at a second base station is reserved for the UE; and a third sending module configured to, under a situation where the handover module judges that the connection is reserved, send an indication message to the UE, herein the indication message indicates the UE to leave a source cell, access a target cell and at the same time keep the connection with the second base station.

An embodiment of the present disclosure further provides a computer-readable storage medium where program instructions are stored, and when executed, the program instructions are capable of implementing the methods.

To sum up, according to the base station handover method in the heterogeneous network and the base station provided by embodiments of the present disclosure, when the master serving base station of the user equipment is handed over, the performance of the link between the user equipment and the second base station can be improved, and the method is applicable to any type of base stations and any type of interfaces with any performance between base stations. By adopting the method, in a process that the UE in a DC state transmits data and/or moves, when the first base station which the UE accesses is handed over, the target base station can determine a state of the link between the UE and the second base station which the UE accesses, therefore the possibility of interruption is reduced or the link is restored as soon as possible. In addition, the data transmission performance and throughput of the user equipment are effectively improved, and the use efficiency of radio resources is improved and the control plane signaling is reduced.

BRIEF DESCRIPTION OF DRAWINGS

FIG. 3 illustrates an exemplary diagram of a scenario where an inter-base station handover solution is applied according to an embodiment of the present disclosure.

FIG. 4 illustrates a flowchart of an inter-base station handover solution according to an embodiment of the present disclosure.

DETAILED DESCRIPTION

A system architecture on which an embodiment of the present disclosure is based is as follow: in a 3GPP system, the system architecture includes a UE, an access network and a core network.

Herein, the UE simultaneously establishes connections with a first base station and a second base station in the access network; and the first base station and the second base station respectively may be any one type of a base station, and an interface (such as an X2 interface) is established therebetween. Control plane signaling and user plane data can be transmitted between the UE and the first base station; At least user plane data can be transmitted between the UE and the second base station. If control plane signaling is also transmitted between the UE and the second base station, the solution of the embodiment of the present disclosure is also applicable.

Herein, the first base station is responsible for transmitting control plane signaling and user plane data between the UE and a node of the core network. In a user plane architecture mode 1 illustrated in FIG. 2*a*, user plane data may be transmitted between the second base station and a serving gateway node in the core network.

Figure 1:
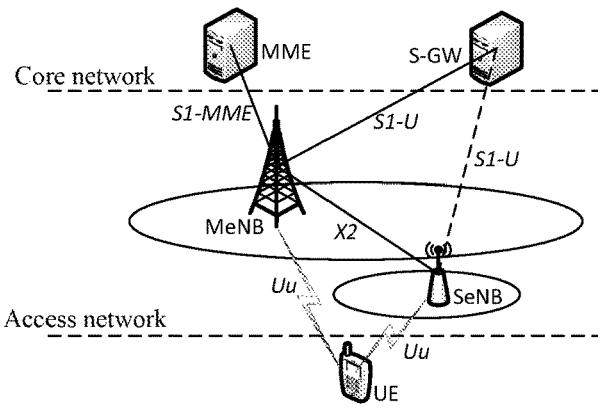
FIG. 1 illustrates a deployment schematic diagram of a heterogeneous network in the related art.
Figure 2A:
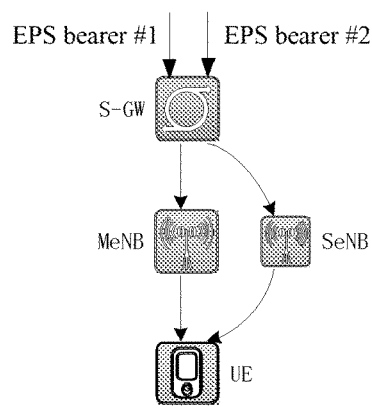
FIG. 2*a* and FIG. 2*b* illustrate schematic diagrams of user plane transmission and protocol stacks in the related art.
Figure 2B:
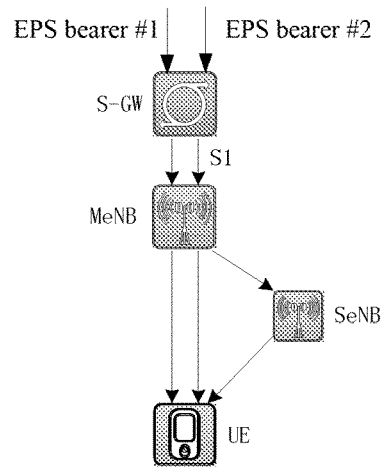

The system architecture, the user plane transmission model and a form of the protocol stack may refer to examples in FIG. 1 and FIG. 2*a* and related description, herein the first base station is equivalent to MeNB and the second base station is equivalent to SeNB. The solution of the embodiment of the present disclosure does not limit the number of SeNBs, i.e., if the UE simultaneously accesses a plurality of base stations, then the solution of the embodiment of the present disclosure is also applicable.

The scenario described in the embodiment of the present disclosure is as follow. Referring to the example in FIG. 3, in a movement process, the signal quality between a UE and a serving cell (called a source cell) of a first base station (called a source base station in a movement scenario) decreases, and the signal quality between the UE and a cell (called a target cell) of a third base station (called a target base station) increases; and during the movement process, the UE is always in a coverage range of the second base station, i.e., the signal quality between the UE and a cell of the second base station is kept good.

After agreement on a request of the source base station is made by the target base station, the source base station indicates the UE to leave the source cell and access the target cell. The procedure enables the target base station to become a new master serving base station of the UE. An X2 interface is established between the target base station and the second base station, and the target base station is responsible for transmitting control plane signaling and user plane data between the UE and the node of the core network.

As illustrated in FIG. 4, in step 401, when a source base station (a first base station) decides to initiate a base station handover procedure, in a handover request message (or called a resource request message, which is for a purpose of requesting a target base station to allow an access of a UE and to be capable of providing resources for continuously supporting communication services of the UE) send to the target base station, the first base station further needs to at least carry a result of a measurement performed by the UE on a cell signal of a second base station which the UE accesses, information about a serving cell of the second base station and resource configuration information for the UE at the second base station (including X2 interface resource configuration information and radio resource configuration resource, such as X2 interface identifier and SeNB UE X2AP ID), in addition to information such as configuration information of the UE at the first base station and a UE context carried by the first base station with reference to an X2-AP message (HANDOVER REQUEST).

In step 402, after the target base station receives the handover request message of the first base station, the target base station executes an admission control, and judges whether a connection of the UE at the second base station is reserved for the UE after an access of the UE; and if the connection is reserved, the target base station sends an assistance request message to the second base station to request the second base station to assist the target base station to provide a dual connectivity service for the UE; and a handover request acknowledgment message is replied to the first base station after an agreement reply of the second base station is received (step 404).

The assistance request message is any one of the following messages:

a secondary base station addition request message, a secondary base station modification request message and a new X2 interface message.

If there is a new bearer which requests to be split to the second base station for transmission in a user plane architecture mode 2 or a user plane architecture mode 1, a user plane tunnel capable of transmitting split bearer data packets further needs to be established.

In step 403, after the second base station receives the assistance request message which is used for the target base station to request for assisting to provide a dual connectivity service for the UE, if the second base station agrees to establish an interface, the second base station sends an acknowledgment message to the target base station, herein the acknowledgment message includes an X2 interface identifier allocated by the second base station for the UE.

A trigger message which is used for negotiating by the target base station and the second base station whether to provide the dual connectivity service for the UE needs to contain identifier information of the UE at the second base station, such that the second base station can recognize the UE at which the procedure aims, and In an exemplary embodiment, such that the second base station can recognize that the master serving base station of the UE is to be handed over. After the establishment of the interface is agreed, the second base station replies an addition or modification request acknowledgment message to the target base station. Herein, the addition or modification request message contains parameter information allocated by the second base station for establishing an interface and resource reconfiguration information requested in the trigger message.

In step 404, after the target base station completes resource configuration for the UE and completes the establishment of the interface with the second base station, the target base station replies an acceptance acknowledgment message (which may be called a handover request acknowledgment message) to the first base station. Herein, the message carries information indicating that the connection with the second base station is reserved and the configuration is unchanged or reconfiguration is performed, and new resource configuration information of the UE at the target base station. If the negotiation between the target base station and the second base station fails or the connection of the UE at the second base station is not reserved, the acknowledgment message carries information that the split bearer is released and then added to the target base station for transmission.

After the first base station receives the acceptance acknowledgement request message of the target base station, the first base station may send an X2 control plane message to the second base station (such as a secondary base station release request message SENB RELEASE REQUEST) to indicate the second base to be released. The X2 control plane signaling may also be the last step of the handover procedure. The release procedure does not influence the user plane data scheduling and resource configuration related to the UE at the second base station.

The first base station forms Radio Resource Control (RRC) signaling oriented at the UE according to the information carried in the received acceptance acknowledgment message and sends the RRC signaling to the UE.

After the UE receives the RRC signaling which is sent by the first base station and indicates the master serving base station to be handed over, according to the information carried in the signaling, on one hand, the UE leaves the serving cell of the first base station, reestablishes or resets a protocol entity corresponding to the bearer related to the first base station according to new configuration, and is synchronized with the target cell and initiates a random access to the target cell. On the other hand, the UE keeps the radio connection with the cell of the second base station, and reconfigures the protocol entity or keeps the protocol entity unchanged.

It needs to be stated that the implementation modes of the present disclosure are described by taking downlink data transmission as an example, and for uplink data transmission (if there is an uplink bearer which is transmitted through the second base station), the UE will transmit the uplink data of the bearer according to the uplink transmission resource allocated by the second base station as soon as possible after a PDCP (Packet Data Convergence Protocol) entity is reestablished according to a new configuration; and the second base station delivers received uplink data packets to the target base station. The protocol entity and the uplink transmission of the SCG bearer are not influenced by the handover of the master serving base station.

The embodiments of the present disclosure will be described below in detail with reference to the drawings. It needs to be stated that the embodiments of the present disclosure and the features in the embodiments may be mutually and freely combined under a situation of no conflict.

Embodiment One

Figure 5:
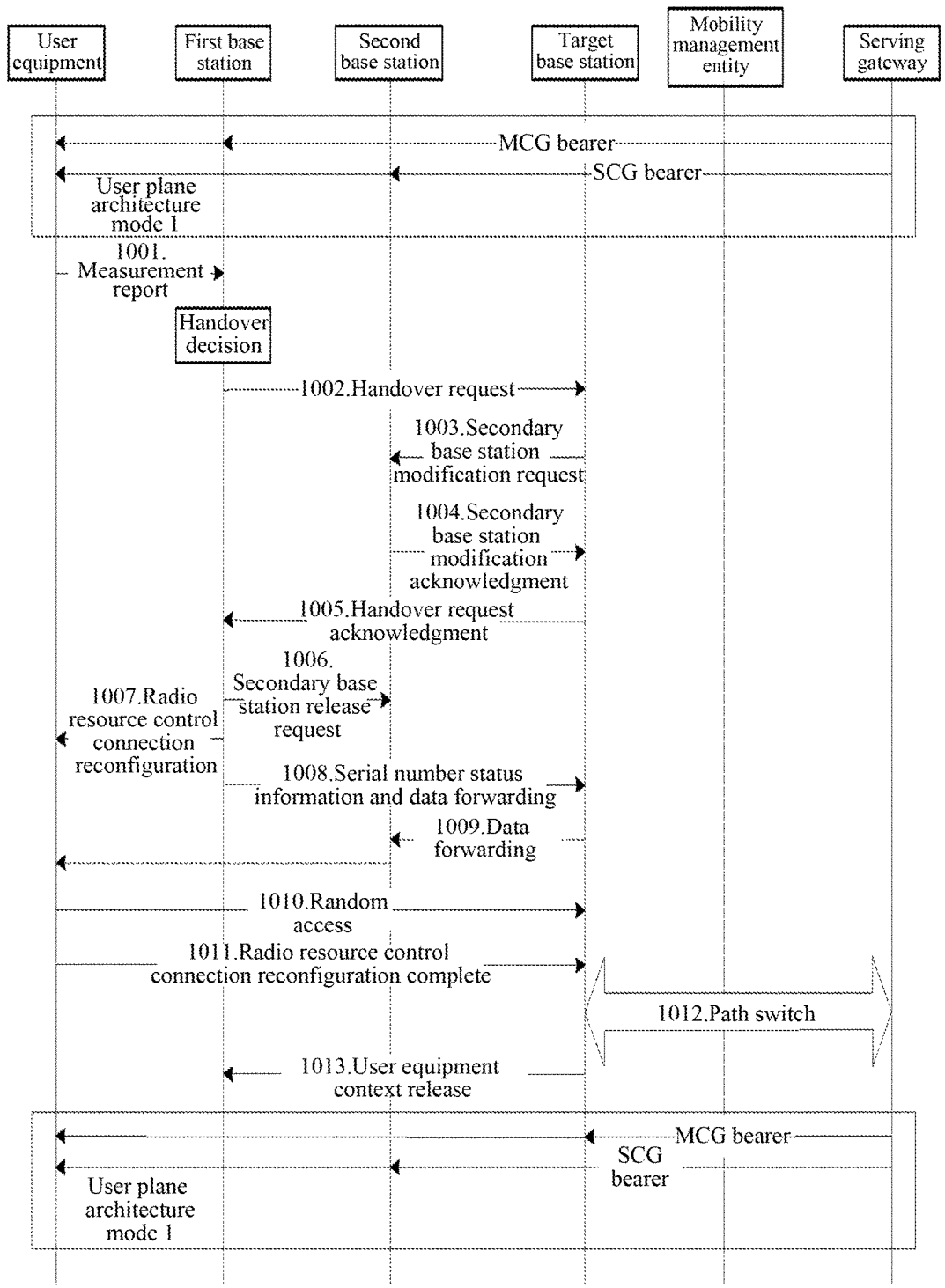
FIG. 5 illustrates a flowchart according to embodiment one of the present disclosure.

System architecture and a scenario are as described above in user plane architecture applies mode 1. At a preparation stage of an inter-base station handover procedure, a target base station further needs to judge a connection between UE and a second base station while determining whether the UE is allowed to access, for example, a resource corresponding to the split bearer needs to be reconfigured. As compared with the related art, reconfiguration of a link between the UE and the second base station in this embodiment is of a non-handover type, and random access may not be required and data transmission is restored faster. As illustrated in FIG. 5, a flow includes the following steps 1001-1013.

In step 1001, a first base station makes a handover decision according to a message 101 (measurement report) of UE (or a result obtained through other radio resource management functions, such as too heavy load), for example, the first base station decides to hand over a master serving base station of the UE to a target base station to continuously obtain a communication service.

In step 1002, in a message 102 (handover request message) sent to the target base station, the first base station further needs to at least carry a result of a measurement performed by the UE on a cell signal of a second base station, information about a serving cell of the second base station and resource configuration information for the UE at the second base station (including X2 interface resource configuration information and radio resource configuration information, such as an X2 interface identifier, i.e., SeNB UE X2AP ID), in addition to all information (such as UE context) carried in a standard defined HANDOVER REQUEST message.

In step 1003, after the target base station receives the message 102, the target base station further needs to judge whether a DC service can be continuously provided for the UE through the second base station in combination with whether an X2 interface has already been (or can be established) between the target base station and the second base station while judging whether access of the UE can be accepted in combination with a resource state of the target base station.

Herein, the target base station judges whether resources corresponding to split bearers (SCG bearers) borne by the second base station need to be reconfigured. Being reconfigured may include: requesting the second base station to perform configuration modification on a protocol entity of the SCG bearers and/or requesting the second base station to increase or decrease the number of the SCG bearers.

When a judgement result is that the resources of the second base station are continuously used and need to be reconfigured, the target base station sends a message 103 to the second base station. The message 103 plays a role of requesting the second base station to establish a control plane and/or user plane cooperative interface capable of providing a DC service for the UE between the target base station and the second base station, and In an exemplary embodiment, the message 103 further includes the target base station informs the second base station of a request for reconfiguring the resources. The message 103 may use a secondary base station addition request message or a secondary base station modification request (SENB MODIFICATION REQUEST) message, and may also be a new X2 interface message.

The message 103 carries resource reconfiguration information of the split bearer, and the resource reconfiguration information of the split bearer includes identifiers of deleted split bearers (the second base station only deletes the bearers under this situation), related information about establishment of added split bearers (which is the same as related information transmitted on an X2 interface), and related information about modification of split bearers. In addition to the split bearer resource reconfiguration information, the message 103 further needs to carry an identifier of the UE at the second base station side. This identifier may be an identifier allocated by SeNB for the UE at the X2 interface, and may also be a C-RNTI (Cell Radio Network Temporary Identifier) of the UE in a radio network, such that the second base station learns about that the master serving base station of the UE is to be handed over. In an exemplary embodiment, if the target base station allocates a new SCG bearer to the second base station and data forwarding needs to be performed, the message 103 further needs to carry a tunnel address for data forwarding.

In step 1004, after the second base station agrees the request of the target base station, the second base station replies an acknowledgment message 104 (such as a secondary base station modification request acknowledgment message, SENB MODIFICATION REQUEST ACKNOWLEDGE) to the target base station. Herein, the message 104 at least carriers a new resource configuration and an X2 interface identifier (SeNB UE X2AP ID, which may be the same as or different from the original identifier), which are allocated by the second base station for the UE, and may further include an allocated tunnel address for data forwarding according to the demand of the target base station.

In step 1005, after the handover request of the first base station is agreed and a preparation for establishing an interface between the target base station and the second base station is made, the target base station replies a message 105 (handover request acknowledgment message) to the first base station. Herein, the message 105 at least carries new resource configuration information (referring to contents contained in a HANDOVER REQUEST ACKNOWLEDGE message defined in a standard) including mobility control information (mobilityControlInfo, i.e., handover) and resource reconfiguration information allocated by the second base station to the UE. Herein, the new resource configuration information is allocated by the target base station to the UE, and the resource reconfiguration information does not include mobilityControlInfo.

In step 1006, according to the resource configuration information allocated to the UE carried in the message 105, after the first base station receives the message 105, the first base station may initiate a secondary base station release procedure to the second base station, i.e., send a message 106 (such as secondary base station release request, SENB RELEASE REQUEST) to the second base station.

In step 1007, the first base station sends a radio resource control connection reconfiguration (RRC Connection Reconfiguration) message 107 to the UE. Herein, the message 107 indicates the UE to leave the cell of the first base station, access a target cell, and at the same time keep the connection with the cell of the second base station, and reconfigure the related protocol entity according to the new resource configuration information.

In step 1008, the first base station may start to send a message 108 (serial number status transfer message, SN STATUS TRANSFER) to the target base station and perform data packet forwarding.

In step 1009, if a data packet which is forwarded belongs to a bearer which is newly allocated by the target base station to the second base station for transmission, the target base station forwards the data packet to the second base station.

In step 1010, the UE accesses the target cell of the target base station through a random access procedure.

In step 1011, the UE sends a message 111 (RRC Connection Reconfiguration Complete message) to the target base station to indicate that the UE has already enabled new radio resource configuration.

In step 1012, after the target base station receives the message 111, the target base station initiates a path switch procedure to a core network to request for change of downlink tunnel endpoints of all or partial data bearers.

In step 1013, after the path switch procedure is ended, the target base station sends a message 113 (UE context release message, UE CONTEXT RELEASE) to the first base station to indicate that the inter-base station handover procedure is successfully completed, and the first base station may delete the UE context after data packets which needs to be forwarded are completely forwarded.

Embodiment Two

Figure 6:
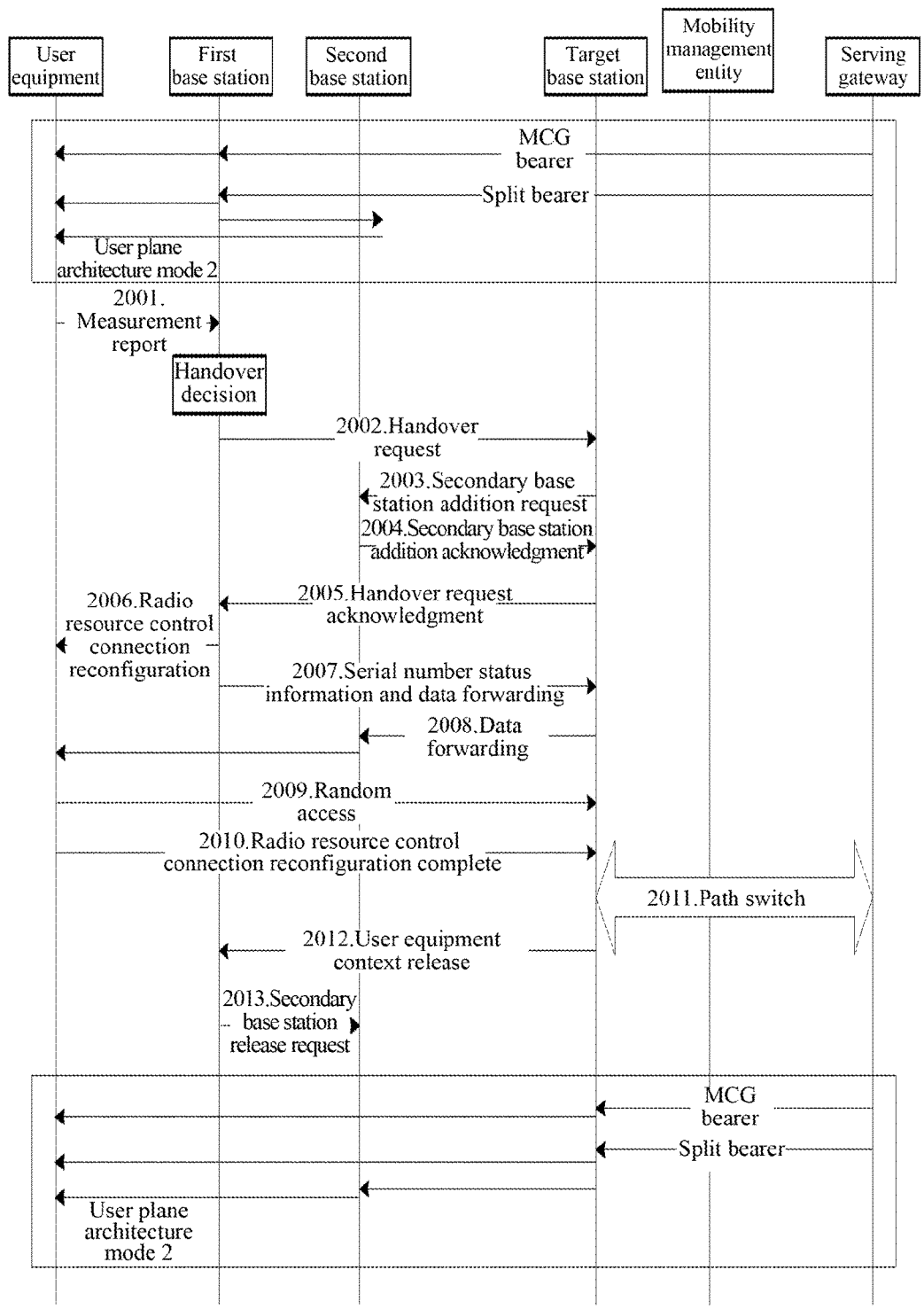
FIG. 6 illustrates a flowchart according to embodiment two of the present disclosure.

System architecture and a scenario are as described above in user plane architecture application mode 2. At a preparation stage of an inter-base station handover procedure, a target base station further needs to judge a connection between UE and a second base station, for example, a resource corresponding to a split bearer is kept unchanged, while determining whether the UE is allowed to access. As illustrated in FIG. 6, a flow includes the following steps 2001-2013.

Step 2001 to step 2002 are the same as step 1001 to step 1002 in embodiment one.

In step 2003, when a judgement result obtained by the target base station is that the resources of the second base station are continuously used and configuration is kept unchanged, the target base station sends a message 203 to the second base station.

The message 203 plays a role of requesting the second base station to establish a control plane and/or user plane cooperative interface, capable of providing a DC service for the UE, between the target base station and the second base station. The message 203 may use a secondary base station addition request (SENB ADDITION REQUEST) message or a secondary base station modification request message, and may also be a new X2 interface message. The message 203 should carry an identifier of the UE at the second base station side, such that the second base station learns about that the master serving base station of the UE is to be handed over.

In step 2004, after the second base station agrees the request of the target base station, the second base station replies an acknowledgment message 204 (such as a secondary base station addition acknowledgment message, SENB ADDITION ACKNOWLEDGE) to the target base station. Herein, the message 204 at least carriers an X2 interface identifier (SeNB UE X2AP ID, which may be the same as or different from the original identifier) specially allocated by the second base station to the UE, and a tunnel address for data forwarding.

In step 2005, after the handover request of the first base station is agreed and a preparation for establishing an interface between the target base station and the second base station is made, the target base station replies a message 205 (handover request acknowledgment message) to the first base station. Herein, the message 205 at least carries new resource configuration information (referring to contents contained in a HANDOVER REQUEST ACKNOWLEDGE message defined in a standard) allocated by the target base station to the UE, and an indication that the UE may continuously keep a link between the UE and the second base station and keep related resource configuration.

In step 2006, according to the resource configuration information allocated to the UE carried in the message 205, the first base station sends a radio resource control connection reconfiguration (RRC Connection Reconfiguration) message 206 to the UE. Herein, the message 206 indicates the UE to leave the cell of the first base station, access a target cell, and at the same time keeps the connection with the cell of the second base station, and keep the resource configuration unchanged, and reconfigure the protocol entity of the bearer corresponding to the master serving base station according to the new resource configuration information.

In step 2007, after the first base station receives the message 205, the first base station may start to send a message 207 (serial number status transfer message, SN STATUS TRANSFER) to the target base station and perform data packet forwarding.

In step 2008, after the target base station receives data packets, the target base station forwards data packets, which belong to the split bearer, to the second base station, and the second base station sends these data packets to the UE through a Uu interface.

In step 2009, the UE accesses the target cell of the target base station through a random access procedure.

In step 2010, the UE sends a message 210 (RRC Connection Reconfiguration Complete message) to the target base station to indicate that the UE has already enabled new radio resource configuration.

Step 2011 and step 2012 are the same as step 1012 and step 1013 in embodiment one.

In step 2013, after the first base station receives the message 212, the first base station initiates a secondary base station release procedure. Herein, the procedure plays a role of releasing the X2 interface related to the UE between the first base station and the second base station. The message 212 may use a secondary base station release request (SENB RELEASE REQUEST) message in a standard, and may also be a new X2 interface message.

Figure 8:
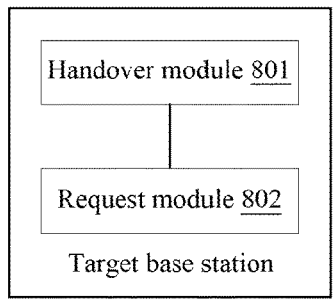
FIG. 8 illustrates a structural schematic diagram of a base station according to an embodiment of the present disclosure.

An embodiment further provides a base station (equivalent to a target base station). As illustrated in FIG. 8, the base station includes a handover module 801 and a request module 802.

The handover module 801 (i.e., a first handover module) is configured to, after receiving a handover request message of a first base station, execute an admission control and judge whether a connection of UE at a second base station is reserved for the UE after the access of the UE.

The request module 802 is configured to, under a situation where the handover module 801 judges that the connection is reserved, send an assistance request message to the second base station to request the second base station to assist the target base station to provide a dual connectivity service for the UE, and reply a handover request acknowledgment message to the first base station after an agreement reply of the second base station is received. Herein, the assistance request message includes an identifier of the UE at the second base station side.

In an exemplary embodiment, in another embodiment, the handover module 801 is further configured to judge whether a split bearer borne by the second base station and a resource corresponding to the split bearer need to be reconfigured.

The request module 802 is further configured to, under a situation where the handover module 801 judges that the split bearer and the resource corresponding to the split bearer need to be reconfigured, send an assistance request message including split bearer resource reconfiguration information to the second base station.

Herein, the assistance request message is any one of the following messages: a secondary base station addition request message, a secondary base station modification request message and a new X2 interface message.

The handover request acknowledgment message includes resource reconfiguration information including mobility control information allocated by the target base station to the UE and resource reconfiguration information allocated by the second base station to the UE.

Or, the handover request acknowledgment message includes resource reconfiguration information including mobility control information allocated by the target base station to the UE and an indication that the UE keeps a link between the UE and the second base station and keeps related resource configuration.

Figure 9:
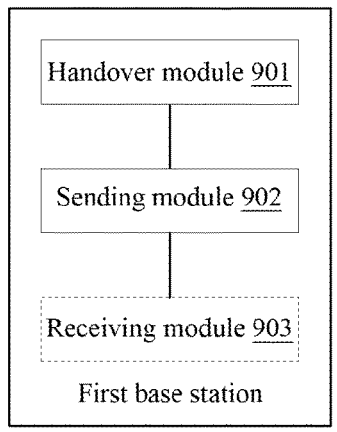
FIG. 9 illustrates a structural schematic diagram of another base station according to an embodiment of the present disclosure.

An embodiment further provides a base station (equivalent to a first base station). As illustrated in FIG. 9, the base station includes a handover module 901 and a sending module 902.

The handover module 901 (i.e., a second handover module) is configured to decide to initiate a base station handover procedure.

The sending module 902 (i.e., a first sending module) is configured to send a handover request message to a target base station. Herein, the handover request message at least carries a result of a measurement performed by UE on a cell signal of a second base station which the UE accesses, information about a serving cell of the second base station and resource configuration information for the UE at the second base station.

In an exemplary embodiment, in another embodiment, the base station may further include a receiving module 903.

The receiving module 903 (equivalent to a first receiving module) is configured to receive a handover request acknowledgment message of the target base station.

The sending module 902 is further configured to send to the second base station an X2 control plane message for indicating the second base station to release an interface related to the UE.

Figure 10:
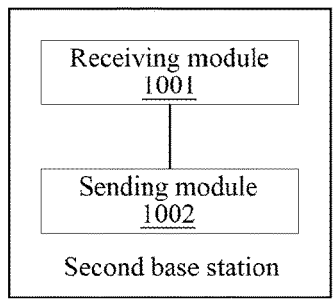
FIG. 10 illustrates a structural schematic diagram of another base station according to an embodiment of the present disclosure.

An embodiment further provides a base station (equivalent to a second base station). As illustrated in FIG. 10, the base station may include a receiving module 1001 and a sending module 1002.

The receiving module 1001 (i.e., a second receiving module) is configured to receive an assistance request message which is used for a target base station to request for assisting to provide a dual connectivity service for UE.

The sending module 1002 (i.e., a second sending module) is configured to, under a situation where an interface is agreed to be established, send an acknowledgment message to the target base station. Herein, the acknowledgment message includes an X2 interface identifier allocated by the second base station to the UE.

Embodiment Three

Figure 7:
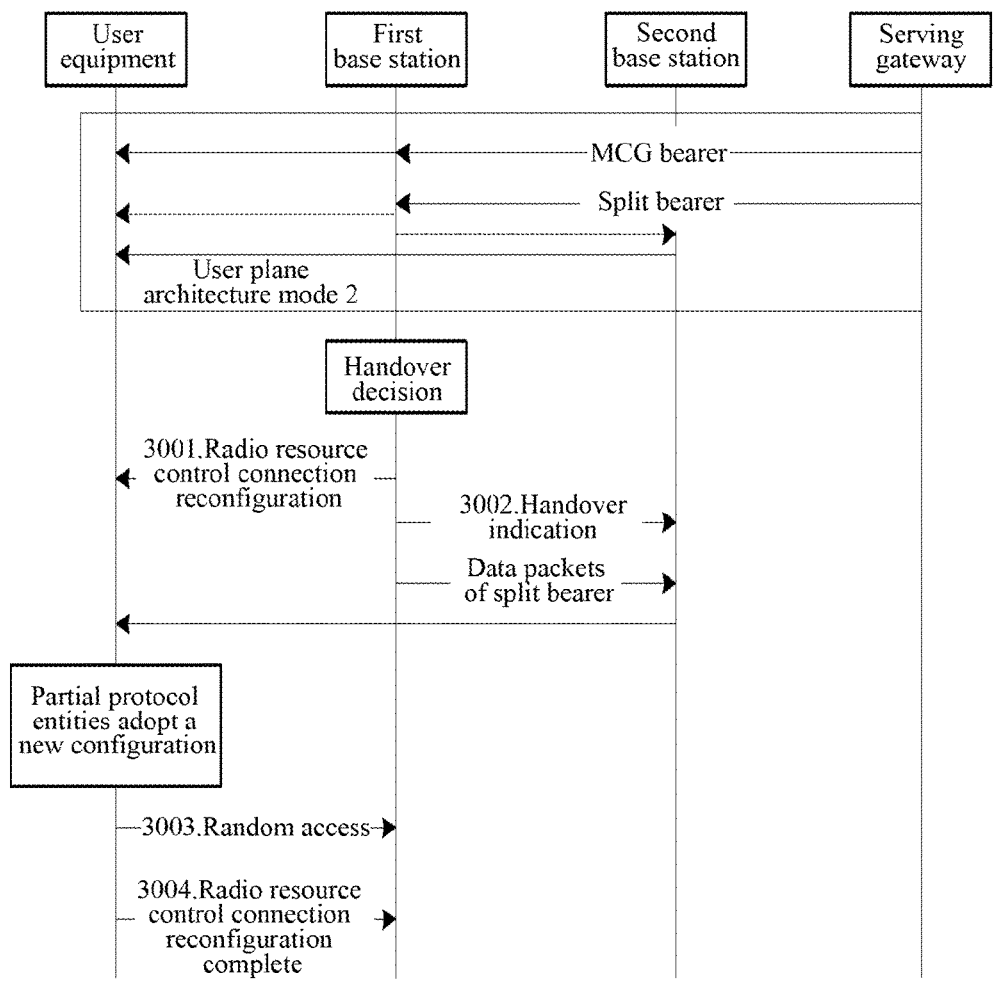
FIG. 7 illustrates a flowchart according to embodiment three of the present disclosure.

System architecture and a scenario are as described in the embodiments of the invention and the background, and are user plane architecture application mode 2. When a serving cell which UE accesses at a first base station needs to be handed over (if the UE is configured with a carrier aggregation at the first base station, then the scenario on which this embodiment is based is that a primary cell (PCell) of the UE at the first base station is handed over), the first base station needs to perform mobility reconfiguration on the UE, which is called a situation of the intra-base station handover in this embodiment. In a handover decision, the first base station needs to determine a connection state between the UE and a second base station and a resource configuration situation. As illustrated in FIG. 7, a flow includes the following steps 3001-3004.

In step 3001, according to a measurement report of UE or that a variable value of a protocol entity at a first base station reaches a set critical value, the first base station decides to hand over a (primary) serving cell (source cell) of the UE to another cell (target cell), and if a handover is caused for a reason that the variable value reaches the critical value, the access cell is kept unchanged before and after the handover; and if a handover is caused for the former reason, the UE may be handed over from cell-1 with a poor signal quality to cell-2 with a good signal quality) in the first base station; and simultaneously judges whether a connection of the UE at a second base station is reserved for the UE. If the connection is reserved, a cell of the second base station which the UE accesses and resource configuration at the second base station side are unchanged; and the first base station sends a message 301 (RRC Connection Reconfiguration message) to the UE to indicate the UE to leave the source cell, and access the target cell and at the same time keep the connection with the second base station and the resource configuration unchanged. Herein, the message 301 further carries new resource configuration information corresponding to the first base station.

In step 3002, the first base station informs the second base station that resources of the master serving base station are reconfigured, which may be indicated through X2 control plane signaling (such as a message 302, which may be called a first base station handover indication message), or may be indicated in a first new configuration data packet sent by the first base station to the second base station.

After a PDCP entity corresponding to a split bearer at the first base station side is reestablished according to a new configuration, a data packet of the split bearer is encapsulated and is delivered to the second base station for transmitting to the UE.

In step 3003, according to the indication of the received message 301, on one hand, the UE leaves the source cell and accesses the target cell through a random access procedure; and on the other hand, all protocol entities corresponding to the first base station at the UE side are reestablished according to the new configuration, but protocol entities (including RLC, MAC and PHY protocol entities of the split bearer) corresponding to the second base station keep the original configuration and continuously operate.

In step 3004, after the UE successfully accesses the target cell, the UE replies a message 304 (RRC Connection Reconfiguration Complete message) to the first base station to indicate that the UE has already enabled the new configuration; and after the first base station receives the message 304, the first base station starts to directly perform user plane transmission scheduling on the UE.

In this embodiment, the first base station keeps the resource configuration of the UE at the second base station side unchanged. In other embodiments, under a situation where the first base station reserves the second base station which the UE accesses, the resource configuration of the UE at the second base station side may also be changed, and that is similar to interaction between the target base station (the first base station in this embodiment) and the second base station in embodiment one.

Figure 11:
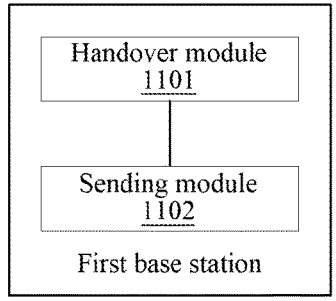
FIG. 11 illustrates a structural schematic diagram of another base station according to an embodiment of the present disclosure.

An embodiment further provides a base station (equivalent to a second base station). As illustrated in FIG. 11, the base station includes a handover module 1101 and a sending module 1102.

The handover module 1101 (i.e., a third handover module) is configured to, when deciding to initiate an intra-base station handover procedure, judge whether a connection of UE at a second base station is reserved for the UE.

The sending module 1102 (i.e., a third sending module) is configured to, under a situation where the handover module judges that the connection is reserved, send an indication message to the UE. Herein, the indication message indicates the UE to leave a source cell, access a target cell and at the same time keep a connection with the second base station.

The ordinary skilled in the art can understand that all or partial steps in the above-mentioned methods may be completed by relevant hardware instructed by a program, and the program may be stored in a computer readable storage medium such as a read-only memory, a magnetic disc or a compact disc or the like. Optionally, all or partial steps in the above-mentioned embodiments may also be implemented by using one or more integrated circuits. Correspondingly, each module/unit in the above-mentioned embodiments may be implemented by means of hardware and may also be implemented by means of a software function module. The present disclosure is not limited to combinations of hardware and software in any specific form.

INDUSTRIAL APPLICABILITY

According to the base station handover method in the heterogeneous network and the base station provided by embodiments of the present disclosure, when the master serving base station of the user equipment is handed over, the performance of the link between the user equipment and the second base station can be improved, and the method is applicable to any type of base stations and any type of interfaces with any performance between base stations. By adopting the method, in a process that the UE in a DC state transmits data and/or moves, when the first base station which the UE accesses is handed over, the target base station can judge a state of the link between the UE and the second base station which the UE accesses, therefore, the possibility of interruption is reduced or the link is restored as soon as possible, and the data transmission performance and throughput of the user equipment are effectively improved, and the use efficiency of radio resources is improved and the control plane signaling is reduced.

What is claimed is:

1. A base station handover method in a heterogeneous network, comprising:
    after receiving a handover request message of a source first base station, executing, by a target base station, an admission control, and judging whether a connection of a UE at a source second base station is reserved for the UE after an access of the UE; if a judgment result is that the connection of the UE at the source second base station is reserved after the access of the UE to the target base station, sending an assistance request message to the source second base station to request the source second base station to reserve the connection of the UE to assist the target base station to provide a dual connectivity service for the UE, and replying a handover request acknowledgment message to the source first base station after obtaining a reply message of the source second base station;
    wherein the handover request message at least carries a result of a measurement performed by the UE on a cell signal of the second base station which the UE accesses, information about a serving cell of the second base station and resource configuration information for the UE at the second base station.

2. The method according to claim 1, wherein the method further comprises:
    judging, by the target base station, whether a split bearer borne by the source second base station and a resource corresponding to the split bearer need to be reconfigured; and if the split bearer and the resource corresponding to the split bearer need to be reconfigured, the assistance request message further comprising resource reconfiguration information of the split bearer.

3. The method according to claim 1, wherein,
    the assistance request message is an X2 interface message.

4. The method according to claim 3, wherein,
    the assistance request message is a secondary base station addition request message or a secondary base station modification request message.

5. The method according to claim 1, wherein,
    the assistance request message comprises an identifier of the UE at a source second base station side.

6. The method according to claim 5, wherein,
    the assistance request message further comprises a tunnel address for data forwarding.

7. The method according to claim 1, wherein,
    the handover request acknowledgment message comprises: resource reconfiguration information allocated by the target base station for the UE and resource reconfiguration information allocated by the source second base station for the UE; or
    the handover request acknowledgment message comprises: resource reconfiguration information allocated by the target base station for the UE and an indication used to indicate that the UE keeps a link between the UE and the source second base station and keeps related resource configuration.

8. A non-transitory computer-readable storage medium where program instructions are stored, and when executed, the program instructions are capable of implementing the method according to claim 1.

9. A base station, comprising:
    a first handover module configured to, after receiving a handover request message of a source first base station, execute an admission control and judge whether a connection of UE at a source second base station is reserved for the UE after an access of the UE; wherein the handover request message at least carries a result of a measurement performed by the UE on a cell signal of the second base station which the UE accesses, information about a serving cell of the second base station and resource configuration information for the UE at the second base station; and a request module configured to, under a situation where the first handover module judges that the connection of the UE at the source second base station is reserved, send an assistance request message to the source second base station to request the source second base station to reserve the connection of the UE to assist the target base station to provide a dual connectivity service for the UE, and reply a handover request acknowledgment message to the source first base station after obtaining a reply message of the source second base station, wherein the assistance request message comprises an identifier of the UE at a source second base station side.

10. The base station according to claim 9, wherein, the first handover module is further configured to judge whether a split bearer borne by the source second base station and a resource corresponding to the split bearer need to be reconfigured; and the request module is further configured to, under a situation where the first handover module judges that the split bearer and the resource corresponding to the split bearer need to be reconfigured, send to the source second base station the assistance request message which comprises resource reconfiguration information of the split bearer.

11. The base station according to claim 10, wherein, the assistance request message is any one of the following messages: a secondary base station addition request message, a secondary base station modification request message and other X2 interface message; and the handover request acknowledgment message comprises: resource reconfiguration information allocated by the target base station for the UE and resource reconfiguration information allocated by the source second base station for the UE; or the handover request acknowledgment message comprises: resource reconfiguration information allocated by the target base station for the UE and an indication used to indicate that the UE keeps a link between the UE and the source second base station and keeps related resource configuration.

12. The base station according to claim 9, wherein, the assistance request message is any one of the following messages: a secondary base station addition request message, a secondary base station modification request message and other X2 interface message; and the handover request acknowledgment message comprises: resource reconfiguration information allocated by the target base station for the UE and resource reconfiguration information allocated by the source second base station for the UE; or the handover request acknowledgment message comprises: resource reconfiguration information allocated by the target base station for the UE and an indication used to indicate that the UE keeps a link between the UE and the source second base station and keeps related resource configuration.

\* \* \* \* \*